United States Patent [19]

Saito et al.

[11] Patent Number: 4,996,257
[45] Date of Patent: Feb. 26, 1991

[54] SURFACE-TREATED POLYORGANOSILSESQUIOXANE FINE POWDER

[75] Inventors: Kenji Saito; Hiroshi Kimura, both of Gunma, Japan

[73] Assignee: Toshiba Silicone Co., Ltd., Tokyo, Japan

[21] Appl. No.: 340,509

[22] Filed: Apr. 18, 1989

[30] Foreign Application Priority Data

Apr. 19, 1988 [JP] Japan .................................. 63-94548

[51] Int. Cl.$^5$ .............................................. C08K 5/24
[52] U.S. Cl. ................................... 524/262; 524/265; 427/387; 428/447; 525/477
[58] Field of Search .............. 427/387; 525/477; 428/447; 524/262, 265

[56] References Cited

U.S. PATENT DOCUMENTS

| | | | |
|---|---|---|---|
| 4,322,542 | 3/1982 | Abbott | 556/425 |
| 4,433,340 | 2/1984 | Mashita et al. | 346/135.1 |
| 4,647,679 | 3/1987 | Panster et al. | 556/9 |
| 4,682,992 | 7/1987 | Fuchs | 55/279 |
| 4,845,163 | 7/1989 | Panster et al. | 525/477 |

FOREIGN PATENT DOCUMENTS

1093556 12/1965 United Kingdom .
1215328 12/1967 United Kingdom .
0090577 3/1983 United Kingdom .

OTHER PUBLICATIONS

Mashita et al., "Amorphous Te-C Films for an Optical Disk", SPIE vol. 329 Optical Disk Technology (1982) pp. 190–194.
Davis et al., "Subbing Layer Surface Energy Effects on the Writing and Degradation Characteristics of Te and Te-alloy Optical Recording Media", IBM Research Laboratory, Proceedings of SPEI, vol. 420 (1983) pp. 260–264.
Ohkawa et al., "Tellurium-Carbon Optical Disc Memory", Toshiba Yanagicho-Works, Dec. 11, 1986, pp. 7–12.

Primary Examiner—Melvyn I. Marquis
Attorney, Agent, or Firm—Sughrue, Mion, Zinn, Macpeak & Seas

[57] ABSTRACT

A polyorganosilsesquioxane fine powder which is surface-treated with an organosilicon comound containing a quaternary ammonium group, represented by the formula (I) or (II):

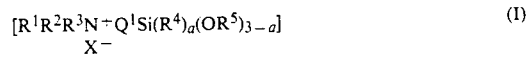
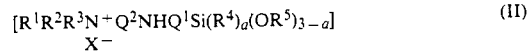

wherein $R^1$ represents an alkyl group, a substituted or unsubstituted aralkyl group, or a group represented by $(C_nH_{2n}O)_mZ$ wherein Z represents a hydrogen atom or an alkyl group, symbol n is an integer of 2 to 4, and symbol m is an integer of 1 to 20; $R^2$ and $R^3$ each independently represents a hydrogen atom, an alkyl group or a hydroxyalkyl group; $Q^1$ and $Q^2$ each independently represents an alkylene group; $R^4$ represents an alkyl group or a phenyl group; $R^5$ represents an alkyl group having 1 to 4 carbon atoms; $X^-$ represents an anion; and symbol a is an integer of 0 to 3.

3 Claims, 1 Drawing Sheet

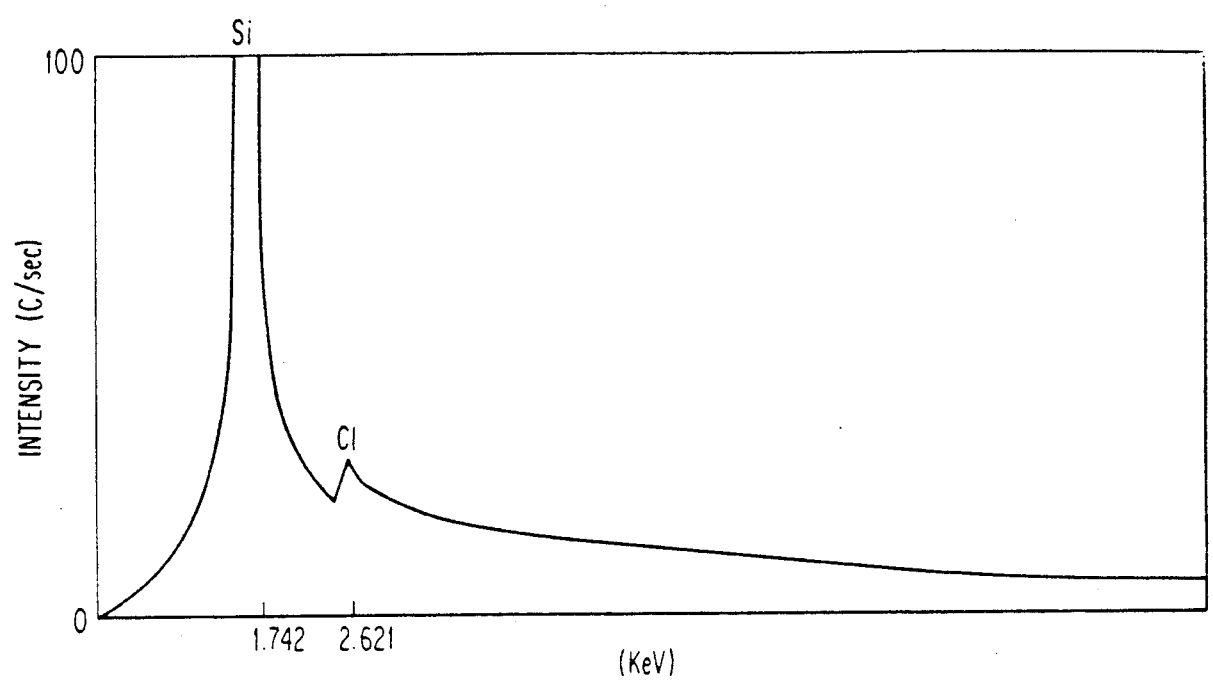

SURFACE-TREATED POLYORGANOSILSESQUIOXANE FINE POWDER

FIELD OF THE INVENTION

This invention relates to a polyorganosilsesquioxane fine powder which has been surface-treated with a silane compound having in its molecule a quaternary ammonium group-containing organofunctional group, and which shows excellent physiological activity and can be advantageously used for marine paints.

BACKGROUND OF THE INVENTION

It is well known that polymethylsilsesquioxane is a polymer comprising methylsilsesquioxane units which are trifunctional organosilicon units and can take a fine powder form. One of the present inventors previously found a method for the preparation of a polymethylsilsesquioxane fine powder suitable as a material for electronic parts and an additive for polymers as disclosed in JP-A- No. 63-77940 and JP-A- No. 63-295637 (the term "JP-A" herein used means an "unexamined published Japanese patent application").

Such a silicone resin fine powder comprising methylsilsesquioxane units is made of minute spherical particles usually having a particle diameter of about 0.05 to 100 μm, and has advantages over silica in having a smaller specific gravity and better slip properties and being excellent in dispersibility into organic resins and organic liquids.

In preparing marine paints using a polymethylsilsesquioxane fine powder as a filler, since the polymer has no physiologically active group in its molecule, a proper conventional means should be taken to counterbalance it. For example, a (meth)acrylate-type polymeric compound in which a hydrolyzable triorganotin group has been incorporated at a side chain is used as a vehicle, or an organotin compound is incorporated into the paints as an antifouling agent. The use of such marine paints had a problem that the sea was contaminated by tin compounds.

As examples of treatment of an inorganic powder with a quaternary ammonium group-containing organosilicon compound, there are a technique of treating silica, alumina, zirconium dioxide or titanium dioxide to produce an anion exchanger as disclosed in, for example, JP-A- No. 56-105757, and a technique of treating glass beads or silica to prepare a germicide as disclosed in, for example, JP-A- No. 61-15804. However, application of the treatment with the above-described organosilicon compound to a polyorganosilsesquioxane fine powder is not known.

SUMMARY OF THE INVENTION

Accordingly, an object of the present invention is to provide a polyorganosilsesquioxane fine powder which is surface-treated with a silane compound having in its molecule a quaternary ammonium group-containing organofunctional group, and which has excellent physiological activity and hence is useful as a filler for marine paints.

BRIEF DESCRIPTION OF THE DRAWING

FIGURE is an X-ray microanalyzer chart for the surface-treated polymethylsilsesquioxane fine powder of this invention obtained in Example 1.

DETAILED DESCRIPTION OF THE INVENTION

The polyorganosilsesquioxane fine powder of this invention is a polyorganosilsesquioxane fine powder which is surface-treated with an organosilicon compound containing a quaternary ammonium group, represented by the following formula (I) or (II):

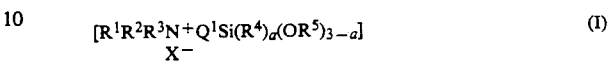

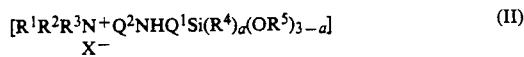

wherein $R^1$ represents an alkyl group, a substituted or unsubstituted aralkyl group, or a group represented by $(C_nH_{2n}O)_mZ$ wherein Z represents a hydrogen atom or an alkyl group, symbol n is an integer of 2 to 4, and symbol m is an integer of 1 to 20; $R^2$ and $R^3$ each independently represents a hydrogen atom, an alkyl group or a hydroxyalkyl group; $Q^1$ and $Q^2$ each independently represents an alkylene group; $R^4$ represents an alkyl group or a phenyl group; $R^5$ represents an alkyl group having 1 to 4 carbon atoms; $X^-$ represents an anion; and symbol a is an integer of 0 to 3.

The polyorganosilsesquioxane fine powder used in this invention is a polymer represented by the formula: $[R^6SiO_{3/2}]_p$ wherein $R^6$ represents a substituted or unsubstituted monovalent hydrocarbon group, and symbol p is a number which is sufficient for the polymer to be solid.

Examples of the group $R^6$ include an alkyl group such as methyl, ethyl, propyl, butyl, pentyl, hexyl, heptyl, octyl, nonyl, decyl or dodecyl; a cycloalkyl group such as cyclopentyl or cyclohexyl; an aralkyl group such as 2-phenylethyl or 2-phenylpropyl; an aryl group such as phenyl and tolyl; an alkenyl group such as vinyl and allyl; and a substituted hydrocarbon group such as γ-chloropropyl, methacryloxypropyl, γ-glycidoxypropyl or 3,4-epoxycyclohexylethyl. Of those, methyl and phenyl are preferred, since the polyorganosilsesquioxane in which $R^6$ is methyl or phenyl can be synthesized easily and the final fine powder of such a polymer is excellent in heat resistance. Further, methyl is more preferred in that a polyorganosilsesquioxane fine powder having a desired average particle diameter can be obtained in a good yield.

The average particle diameter of the polyorganosilsesquioxane is not especially limited. However, from the standpoint of the stability of a liquid disperse system when the fine powder of this invention is dispersed into a liquid phase, it is preferably 100 μm or less, more preferably in the range of from 0.05 to 20 μm.

A polyorganosilsesquioxane fine powder can be prepared by, for example, the method described in JP-A- No. 60-13813 and also the above-described JP-A- No. 63-77940 and JP-A- No. 63-295637.

The quaternary ammonium group-containing organosilicon compound which can be used for the surface treatment is a compound represented by the formula (I) or (II) described before.

Explanation of each symbol in the formulae (I) and (II) is given below.

Examples of the group $R^1$ include an alkyl group such as methyl, ethyl, propyl, butyl, pentyl, hexyl, heptyl, octyl, nonyl, decyl, dodecyl, tetradecyl, hexadecyl, octadecyl or eicosyl; and a substituted or unsubstituted aralkyl group such as a benzyl, β-phenylethyl, β-phenylpropyl, 2-methylbenzyl or 4-methylbenzyl.

Examples of the group represented by $(C_nH_{2n}O)_mZ$ include a (poly)oxyalkylene chain comprising constituent unit(s) of oxyethylene, oxypropylene, oxytetramethylene or the like. Examples of the group, Z, at the terminal of the (poly)oxyalkylene chain include hydrogen, methyl, ethyl, propyl, butyl, hexyl, octyl, etc.

Examples of $R^2$ and $R^3$ include hydrogen; an alkyl group such as methyl, ethyl, propyl, butyl, pentyl, hexyl, heptyl, octyl, nonyl, decyl, dodecyl, tetradecyl, hexadecyl, octadecyl, eicosyl, etc; and a hydroxyalkyl group such as hydroxyethyl, hydroxypropyl, etc. Of those, methyl is preferred because of easy availability of raw materials and easy synthesis of the organosilicon compound with a methyl group as $R^2$ and $R^3$.

Examples of the alkylene group of $Q^1$ include methylene, trimethylene, tetramethylene, pentamethylene, hexamethylene, etc. Of those, trimethylene is preferred because of easy synthesis and handling of the organosilicon compound with a trimethylene group as $Q^1$.

Examples of the alkylene group of $Q^2$ include ethylene, trimethylene, tetramethylene, etc.

Examples of the alkyl group represented by $R^4$ include methyl, ethyl, propyl, butyl, etc. As the group of $R^4$, methyl is preferred because of easy synthesis and high thermal stability of the organosilicon compound with a methyl group as $R^4$ and because the surface treatment can be performed smoothly by the use of such organosilicon compound.

Examples of the alkyl group having 1 to 4 carbon atoms of $R^5$ include methyl, ethyl, propyl or butyl. Of those, methyl is preferred since the surface treatment with the organosilicon compound having methyl as $R^5$ is easy. If the alkyl group of $R^5$ has 5 or more carbon atoms, a sufficient surface treatment effect at a low temperature cannot be obtained.

Examples of X which forms the anion $X^-$ include chlorine, bromine or iodine. Of those, chlorine is preferred because raw materials are easily available and handled.

Symbol a may be any one of 0, 1, 2 and 3. However, 0, 1 or 2, especially 0, is preferred, from the standpoint of making strong bonding to silanol groups remaining in the polyorganosilsesquioxane to be treated.

The quaternary ammonium group in the organosilicon compound represented by the formula (I) or (II) can be selected from a variety of examples. However, the following are preferred, because those groups impart high physiological activities, chemical stabilities and good handling properties to the resulting organosilicon compounds.

$(CH_3)_3N^+C_3H_6-$
$C_6H_{13}(CH_3)_2N^+(CH_2)_3-$
$C_{12}H_{25}(CH_3)_2N^+(CH_2)_3-$
$C_{14}H_{29}(CH_3)_2N^+(CH_2)_3-$
$C_{16}H_{33}(CH_3)_2N^+(CH_2)_3-$
$C_{18}H_{37}(CH_3)_2N^+(CH_2)_3-$
$C_{18}H_{37}(CH_3)[H(OC_2H_4)_3]N^+CH_2-$
$(CH_3)_3N^+C_2H_4NH(CH_2)_3-$
$C_{18}H_{37}(CH_3)_2N^+C_2H_4NH(CH_2)_3-$
$CH_3C_6H_4CH_2N^+C_2H_4NH(CH_2)_3-$

In the organosilicon compound of the formula (I) or (II), the proportion of the quaternary ammonium group is not particularly limited. However, the proportion is preferably 0.1 mole % or more, more preferably from 0.1 to 50 mole %. In the case of an organosilicon compound having two nitrogen atoms, either of the two may form the quaternary ammonium group.

Examples of the quaternary ammonium group-containing organosilicon compound in which the quaternary ammonium group is represented by the formula $C_{18}H_{37}(CH_3)_2N^+(CH_2)_3-$, for example, are as follows:
$C_{18}H_{37}(CH_3)_2N^+(CH_2)_3Si(OCH_3)_3$
$C_{18}H_{37}(CH_3)_2N^+(CH_2)_3SiCH_3(OCH_3)_2$
$C_{18}H_{37}(CH_3)_2N^+(CH_2)_3Si(OC_2H_5)_3$ For the surface treatment of the polyorganosilsesquioxane fine powder with the above-described quaternary ammonium group-containing organosilicon compound, any method can be employed so long as the surface of the fine powder can be covered with the organosilicon compound.

For example, there are the following methods: a method in which the fine powder is placed in the quaternary ammonium group-containing organosilicon compound, thereby allowing the compound to be adsorbed onto the powder; a method in which a mixture of the organosilicon compound and the polyorganosilsesquioxane fine powder is ground by means of a ball mill, mortar or the like, to perform surface treatment; a method in which a solution of the organosilicon compound is prepared using a solvent capable of dissolving the organosilicon compound and then the fine powder is added thereto, thereby allowing the organosilicon compound to be adsorbed onto the fine powder; and a method in which the fine powder is dispersed into a solvent capable of dissolving the organosilicon compound and then the organosilicon compound is added thereto, thereby allowing the organosilicon compound to be adsorbed onto the fine powder. Examples of the solvent to be used in above methods include water, methanol, ethanol ethylene glycol and the like, and a suitable solvent can be selected according to the solubility of the organosilicon compound and the purpose of use of the final surface-treated fine powder. The solvent which has been used in the treatment may be or may not be removed depending upon the purpose of use of the final product.

The amount of the quaternary ammonium group-containing organosilicon compound used in the surface treatment varies depending upon the specific surface area of the polyorganosilsesquioxane fine powder, but is generally from 0.1 to 30 wt % based on the weight of the fine powder.

The surface-treated polyorganosilsesquioxane fine powder of the present invention has excellent physiological activity, and hence is useful as a filler for marine paints or treating agents for fish netting, such paints and treating agents having the property of preventing adhesion of marine organisms. Further, taking advantage of its polarity, the fine powder of this invention can also be advantageously used as a treating agent for toners, a component of adhesives, and a dispersed phase component in an electroviscous liquid.

The present invention will be described in more detail by reference to the following Examples, Reference Example, Application Examples and Comparative Examples, which should not be construed to be limiting the scope of the invention. In the examples, all percents, parts, ratios and the like are by weight unless otherwise indicated.

In the Examples, surface-treating agents, A-1 to A-5, each having the following molecular structure, were used.

$C_{18}H_{37}(CH_3)_2N^+(CH_2)_3Si(OCH_3)_3$    A-1
$Cl^-$ $C_{14}H_{29}(CH_3)_2N^+(CH_2)_3SiCH_3(OCH_3)_2$    A-2
$Cl^-$ $C_{18}H_{37}(CH_3)[H(OC_2H_4)_3]N^+CH_2Si(OCH_3)_3$    A-3
$Cl^-$ $C_{12}H_{25}(CH_3)_2N^+(CH_2)_2NH(CH_2)_3Si(OCH_3)_3$    A-4
$Cl^-$ $CH_3.C_6H_4.CH_2N^+H_2(CH_2)_2NH(CH_2)_3Si(OCH_3)_3$    A-5
$Cl^-$

EXAMPLE 1

According to the method described in JP-A- No. 60-13813, methyltrimethoxysilane was brought into contact with an aqueous solution of ammonia to obtain a polymethylsilsesquioxane fine powder having an average particle diameter of 2 μm. 100 Parts of the resulting fine powder was introduced into an automatic mortar. A surface-treating solution which had been prepared by dissolving the surface-treating agent as shown in Table 1 in 100 parts of methanol was introduced into the automatic mortar, and the resulting mexture was stirred thoroughly. Thereafter, the stirring was continued at room temperature for 2 hours under normal pressure. Subsequently, the resulting mixture was dried in a drying oven at 105° C., thereby obtaining a surface-treated polymethylsilsesquioxane fine powder.

The fine powder thus obtained was subjected to elemental analysis using an X-ray microanalyzer. The XMA chart obtained with a Kα line is given in the FIGURE, which shows a peak of Cl at 2.621 keV besides a peak of Si at 1.742 keV.

EXAMPLES 2 to 5

The same procedures as in Example 1 were repeated except that the surface-treating agents as shown in Table 1 were used in place of A-1, thereby obtaining surface-treated polymethylsilsesquioxane fine powders.

TABLE 1

| | Surface-treating agent (part) | | | | |
|---|---|---|---|---|---|
| | A-1 | A-2 | A-3 | A-4 | A-5 |
| Example 1 | 0.8 | — | — | — | — |
| Example 2 | — | 1.0 | — | — | — |
| Example 3 | — | — | 0.7 | — | — |
| Example 4 | 0.8 | — | — | 0.2 | — |
| Example 5 | — | — | — | — | 0.8 |

EXAMPLES 6 AND 7

The same procedures as in Example 1 were repeated except that polymethylsilsesquioxane powders having average particle diameters of 0.8 μm (Example 6) and 0.3 μm (Example 7) were used, thereby obtaining surface-treated polymethylsilsesquioxane fine powders.

REFERENCE EXAMPLE

A solution was prepared by mixing 30 parts of methyl isobutyl ketone, 10 parts of xylene and 10 parts of toluene. To this solution were added 10 parts of a vinyl chloride resin and 20 parts of rosin, and the resulting mixture was stirred until the solids were dissolved uniformly, thereby obtaining a vehicle for coating compositions.

APPLICATION EXAMPLES 1 TO 7

Preparation of Steel Plates for Anti-fouling Test

A rolled steel plate, as specified in JIS G 3141, having a thickness of 1 mm and a length and a width of 30 cm each was coated with a rust-colored "SUBOID" primer (manufactured by Dai Nippon Toryo Co., Ltd.) in a thickness of 50 to 60 μm, and then left at room temperature for 24 hours. Thereafter, the resulting steel plate was further coated with a white-colored "ACRYLMARINE" intercoat (manufactured by Dai Nippon Toryo Co., Ltd.) in a thickness of 25 to 30 μm, and then left for 24 hours, thereby preparing a steel plate for use in an anti-fouling test shown below.

Preparation of Coating Compositions

Using the vehicle obtained in Reference Example and the surface-treated polymethylsilsesquioxane fine powders obtained in Examples 1 to 7, coating compositions were prepared according to the formulations as shown in Table 2.

TABLE 2

| Formulation (part) | Application Example 1 | Application Example 2 | Application Example 3 | Application Example 4 | Application Example 5 | Application Example 6 | Application Example 7 |
|---|---|---|---|---|---|---|---|
| Fine powder of each Example | (Example 1) 100 | (Example 2) 100 | (Example 3) 100 | (Example 4) 100 | (Example 5) 100 | (Example 6) 100 | (Example 7) 100 |
| Vehicle | 200 | 200 | 200 | 200 | 200 | 200 | 200 |
| Red iron oxide | 30 | 30 | 30 | 30 | 30 | 30 | 30 |
| Methyl isobutyl ketone | 50 | 50 | 50 | 50 | 50 | 50 | 50 |

Stability Test

The coating compositions thus prepared were allowed to stand at room temperature for a week. As a result, no sedimentation of the surface-treated polymethylsilsesquioxane fine powder or red iron oxide was observed, and all the coating compositions maintained their uniform states.

Anti-fouling Test

The steel plates on which primer and intercoat layers had been formed, as described above, were separately coated with the coating compositions prepared above in a thickness of 100 μm, and then left at room temperature for 24 hours. Thus, test pieces were prepared.

Those test pieces were immersed in seawater for 6 months, and then checked for fouling and damage due to adhesion of marine organisms. As a result, almost no fouling or damage was observed on all the test pieces.

COMPARATIVE APPLICATION EXAMPLE 1

A coating composition was prepared, and a stability test and an anti-fouling test were performed in the same manner as in Application Examples 1 to 7 except that 30 parts of a polymethylsilsesquioxane fine powder was used in place of the surface-treated polymethylsilsesquioxane fine powder. As a result, the thus-obtained coating composition showed good stability, but in the antifouling test, adhesion of marine organisms was observed over almost all the surfaces.

COMPARATIVE APPLICATION EXAMPLE 2

A coating composition was prepared in the same manner as in Application Examples 1 to 7 except that 2.5 parts of cuprous oxide was used in place of the surface-treated polymethylsilsesquioxane fine powder and the amount of the vehicle was changed to 100 parts. The coating composition thus obtained was allowed to stand for a week. As a result, all the cuprous oxide sedimented, forming a hard cake.

Meanwhile, another coating composition was prepared in the same manner as just above except that 2 parts of bentonite was incorporated further. Its stability was tested, and sedimentation of cuprous oxide was observed.

COMPARATIVE APPLICATION EXAMPLE 3

The steel plate on which primer and intercoat layers had been formed was subjected to the anti-fouling test with the intercoat layer exposed. As a result, the plate was badly fouled and damaged.

While the invention has been described in detail and with reference to specific embodiments thereof, it will be apparent to one skilled in the art that various changes and modifications can be made therein without departing from the spirit and scope thereof.

What is claimed is:

1. A polyorganosilsesquioxane fine powder which is contacted with an organosilicon compound containing a quaternary ammonium group, so that the surface of the polyorganosilsesquioxane is covered with the organosilicon compound, wherein the organosilicon compound is represented by the formula (I) or (II):

$$[R^1R^2R^3N^+Q^1Si(R^4)_a(OR^5)_{3-a}] \quad \text{(I)}$$
$$X^-$$

$$[R^1R^2R^3N^+Q^2NHQ^1Si(R^4)_a(OR^5)_{3-a}] \quad \text{(II)}$$
$$X^-$$

wherein $R^1$ represents an alkyl group, a substituted or unsubstituted aralkyl group, or a group represented by $(C_nH_{2n}O)_mZ$ wherein Z represents a hydrogen atom or an alkyl group, symbol n is an integer of 2 to 4, and symbol m is an integer of 1 to 20; $R^2$ and $R^3$ each independently represents a hydrogen atom, an alkyl group or a hydroxyalkyl group; $Q^1$ and $Q^2$ each independently represents an alkylene group; $R^4$ represents an alkyl group or a phenyl group; $R^5$ represents an alkyl group having 1 to 4 carbon atoms; X represents an anion; and symbol a is an integer of 0 to 3.

2. A polyorganosilsesquioxane fine powder as claimed in claim 1, wherein the polyorganosilsesquioxane is represented by the formula $$[R^6SiO_{3/2}]_p$$

wherein $R^6$ represents a substituted or unsubstituted monovalent hydrocarbon group, and p is a number which is sufficient for the polymer to be solid.

3. A polyorganosilsesquioxane fine powder as claimed in claim 1, wherein the fine powder has an average particle diameter of 100 μm or less.

* * * * *